(12) United States Patent
Eberlein

(10) Patent No.: US 9,550,509 B2
(45) Date of Patent: Jan. 24, 2017

(54) MOBILE TRANSPORTING MEANS

(71) Applicant: Martin Eberlein, Kammeltal (DE)

(72) Inventor: Martin Eberlein, Kammeltal (DE)

( * ) Notice: Subject to any disclaimer, the term of this patent is extended or adjusted under 35 U.S.C. 154(b) by 0 days.

(21) Appl. No.: 14/890,524

(22) PCT Filed: May 8, 2014

(86) PCT No.: PCT/DE2014/000237
§ 371 (c)(1),
(2) Date: Nov. 11, 2015

(87) PCT Pub. No.: WO2014/183737
PCT Pub. Date: Nov. 20, 2014

(65) Prior Publication Data
US 2016/0107667 A1    Apr. 21, 2016

(30) Foreign Application Priority Data
May 11, 2013    (DE) .................... 20 2013 004 429 U

(51) Int. Cl.
*B62B 3/18*        (2006.01)
*B62B 3/14*        (2006.01)

(52) U.S. Cl.
CPC ............... *B62B 3/18* (2013.01); *B62B 3/1476* (2013.01); *B62B 3/1404* (2013.01)

(58) Field of Classification Search
CPC ........ B62B 3/14; B62B 3/1476; B62B 3/1404; B62B 3/18; B62B 3/182
See application file for complete search history.

(56) References Cited

U.S. PATENT DOCUMENTS 2,738,201 A * 3/1956 Spears .................. B62B 3/1476
                                                280/33.996
2,992,010 A * 7/1961 Sides .................... B62B 3/1476
                                                280/33.997
(Continued)

FOREIGN PATENT DOCUMENTS

DE         8214932 U1     7/1982
DE         8714522 U1     5/1988
(Continued)

OTHER PUBLICATIONS

International Search Report and Written Opinion of the International Searching Authority for PCT/DE2014/000237 (in English and German), mailed Oct. 1, 2014; ISA/EP.

*Primary Examiner* — Frank Vanaman
(74) *Attorney, Agent, or Firm* — Harness, Dickey & Pierce, P.L.C.

(57) ABSTRACT

A manually movable transporting apparatus that is nestable with like transporting apparatuses has a chassis equipped with longitudinal members, which carries a loading device which is mounted on the chassis so as to be movable about respective horizontal axes and rests on at least one support. A supporting element is provided at the front end of the loading device and at least one inclined deflector surface is arranged in the rear region of the apparatus, which drops obliquely towards the rear and being designed to receive the supporting element of a further identical transporting apparatus driven onto the surface. At least one clearance is formed next to each support, and wherein each deflector surface is located in a clearance. When two transporting apparatuses are nested, each deflector surface of one transporting apparatus takes up the clearance assigned to the deflector surface of the other transporting apparatus.

10 Claims, 3 Drawing Sheets

(56) References Cited

U.S. PATENT DOCUMENTS

| | | | | |
|---|---|---|---|---|
| 3,197,224 | A * | 7/1965 | Kappen | B62B 3/1476 |
| | | | | 280/33.996 |
| 3,813,111 | A * | 5/1974 | Ruger | B62B 5/0009 |
| | | | | 280/33.991 |
| 9,120,497 | B2 | 9/2015 | Eberlein | |
| 2002/0140188 | A1* | 10/2002 | O'Quin | B62B 3/1404 |
| | | | | 280/33.991 |
| 2003/0205875 | A1* | 11/2003 | Ondrasik | B60B 33/0002 |
| | | | | 280/47.34 |
| 2008/0211200 | A1* | 9/2008 | Eberlein | B62B 3/02 |
| | | | | 280/33.991 |
| 2013/0069326 | A1* | 3/2013 | Padgett | B62B 3/1476 |
| | | | | 280/47.35 |
| 2013/0334780 | A1 | 12/2013 | Eberlein | |

FOREIGN PATENT DOCUMENTS

| | | |
|---|---|---|
| DE | 20-2006-019867 U1 | 6/2007 |
| DE | 20-2011-003780 U1 | 1/2012 |
| EP | 1775193 | 4/2007 |

\* cited by examiner

MOBILE TRANSPORTING MEANS

CROSS REFERENCE TO RELATED APPLICATIONS

This application is a U.S. National Phase Application under 35 U.S.C. 371 of International Application No. PCT/DE2014/000237 filed on May 8, 2014 and published in German as WO 2014/183737 A1 on Nov. 20, 2014. This application is based on and claims the benefit of priority from German Patent Application No. 20 2013 004 429.2 filed May 11, 2013. The entire disclosures of the above applications are incorporated herein by reference.

BACKGROUND AND SUMMARY

The invention relates to a mobile transportation apparatus which is nestable in a space-saving manner with like transportation apparatuses and has a chassis with longitudinal beams, which carries at least one storage installation for storing items, wherein each storage installation is mounted on the chassis so as to be movable in each case about a horizontal axis and bears on at least one support which is located on the chassis, and wherein at the front end of the storage installation at least one support element is provided and in the rear region of the transportation apparatus at least one inclined impact face which is downwardly inclined toward the rear and is specified for the at least one support element of a further like transportation apparatus, which may be pushed into a transportation apparatus located in front, to be run thereonto is disposed.

A transportation apparatus of this type is already known by way of a transportation cart which is described in document DE 82 14 932 U1. In order for transportation apparatuses of this type, equipped with a storage installation, to be able to be pushed into one another in a space-saving manner, that is to say to be nested, the chassis of said transportation apparatuses when viewed from above have a trapezoidal plan view, the longer parallel chassis frame side thereof missing. The storage installation which is designed as a load-carrying platform at the front has at least one support element. An impact face which is downwardly inclined toward the rear is disposed at the rear end of the transportation apparatus, so as to facilitate nesting. It cannot be derived from the document how the storage installation is supported on the chassis at the front. In the case of known transportation carts which have neither support elements nor impact faces, support elements which are configured so as to be comparatively high and which support the storage installation on the chassis are located on the lower side of the storage installation. High support elements cause a large nesting spacing between two nested transportation apparatuses, which for reasons of space is not desirable.

A transportation apparatus in the preferred form of a shopping cart is described in document DE 20 2011 003 780 U1. This transportation apparatus also has a trapezoidal chassis, but this chassis is designed such that transportation apparatuses which are equipped with such chassis may be nested in a far tighter manner than has been previously possible. However, this transportation apparatus has neither a support element nor an impact face of the type described at the outset.

The same similarly applies to a transportation container according to document EP 1 775 193 A3. Also in the case of this transportation container neither impact faces nor support elements are provided for each storage installation.

Proceeding from the mentioned prior art, the object of the invention lies in refining a transportation apparatus of the type mentioned at the outset such that this transportation apparatus may be nested with a further like transportation apparatus in an extremely tight manner. Nesting spacings such as are possible in the case of transportation apparatuses according to DE 20 2011 003 70 U1 are targeted.

The achievement of the object lies in that at least one free space is formed beside each support, and in that in the horizontal view of the transportation apparatus and when viewed along the longitudinal direction of the latter each impact face is visualized so as to be plunged into a free space, and in that during nesting of two transportation apparatuses each impact face of the one transportation apparatus utilizes or claims the free space of the other transportation apparatus assigned to said impact face of the one transportation apparatus.

The decisive advantage of the invention is evident, for example, when a transportation apparatus which is equipped with two supports is pushed into a like transportation apparatus which is located in front, so as to be able to store both transportation apparatuses in a nested and space-saving manner. When being pushed into one another, the two supports of the transportation apparatus to be pushed in pass to the right and the left of the impact face of the transportation apparatus located in front. The clear spacing between the supports is larger than the width of the impact face, such that the impact faces and supports of the transportation apparatuses do not impede one another when being pushed into one another. The impact face of the transportation apparatus located in front here utilizes the free space of the transportation apparatus to be pushed thereinto and thus permits that like transportation apparatuses may be nested in a space-saving manner in an even tighter manner than has been previously possible and without any mutual obstruction. The same advantages are gained when the at least one support and the impact faces and the support elements are disposed in a different manner to what has just been described but in consideration of the proposed concept of the invention, as will be described hereunder.

DRAWINGS

The invention will be explained in more detail by means of exemplary embodiments. In the figures.

DETAILED DESCRIPTION

Figure 1:
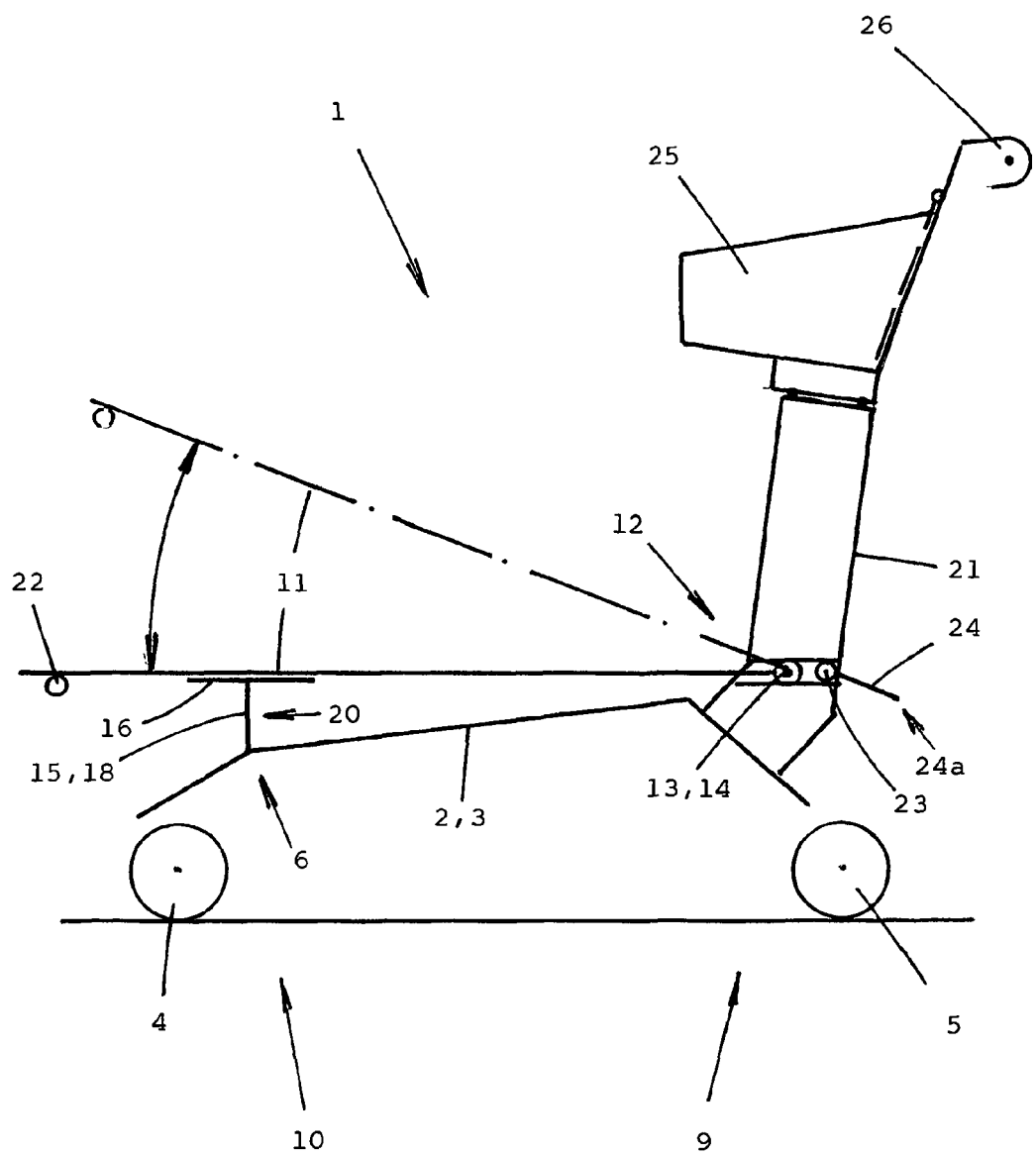
FIG. 1 shows a side view of a transportation apparatus in the form of a transportation cart, the storage installation of which is configured as a load-carrying platform.
Figure 2:
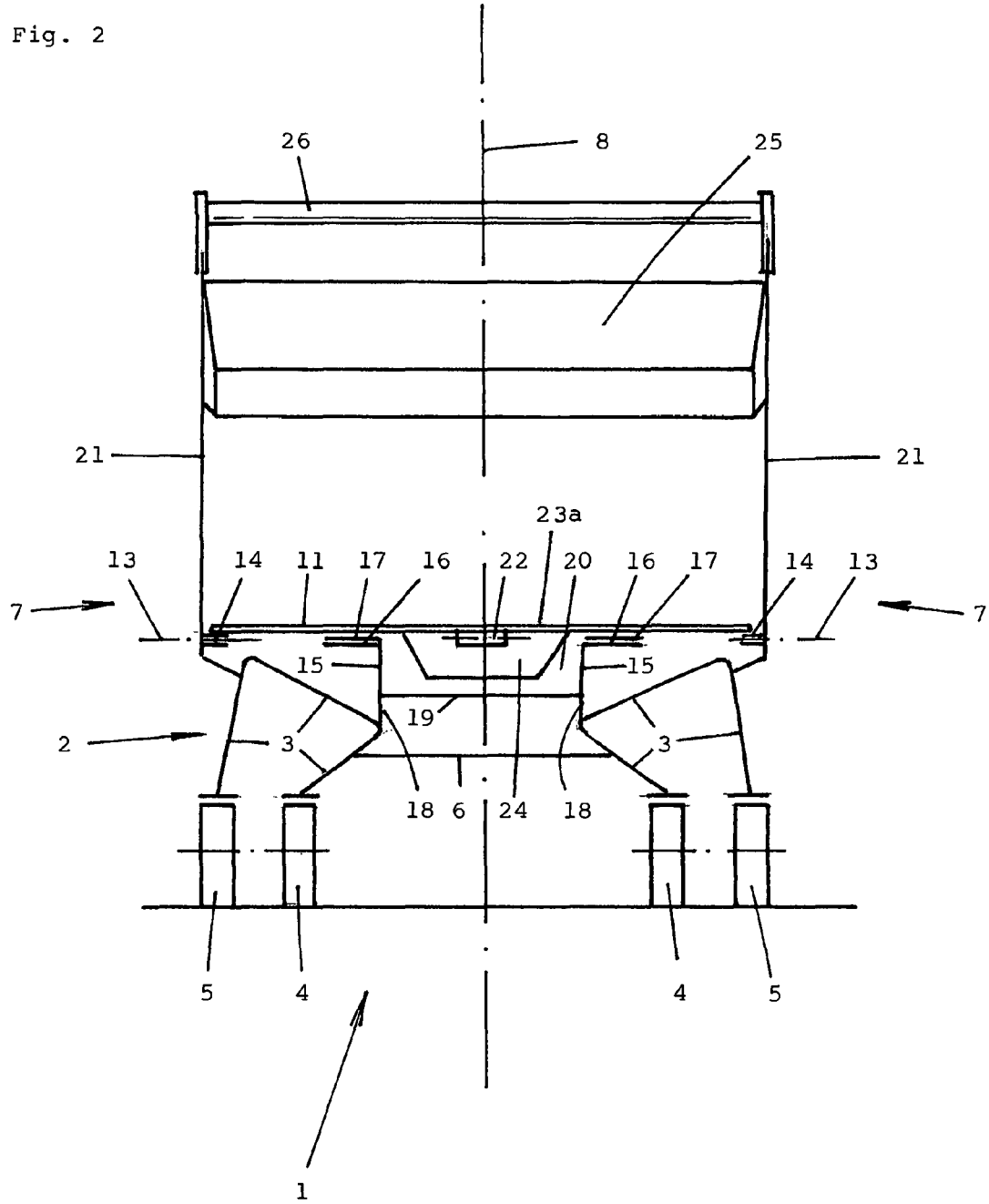
FIG. 2 shows the same transportation apparatus in a view oriented in the longitudinal direction of the transportation cart.

The same transportation apparatus 1 which is shown in a schematic illustration both in FIGS. 1 and 2 has a chassis 2. The chassis 2 has two longitudinal beams 3, for example, such as have been described in DE 20 2011 003 780 U1. Front and rear castors 4, 5 are disposed at the free ends of the longitudinal beams 3. The wheel track of the front castors 4 is smaller than the wheel track of the rear castors 5. The longitudinal beams 3 near the front castors 4 are connected by a transverse web 6. In the rear region 9 of the thus mobile transportation apparatus 1, and emanating from each longitudinal beam 3, in each case one spar 21 runs upward. The chassis 2 carries a storage installation 11 in the shape of a known load-carrying platform. In the rear region 9, the storage installation 11 is mounted on the chassis 2 so as to be movable about a horizontal axis 13. In the example, the hearings 14 which are specified for this purpose are located on the spars 21. In the front region 10, the storage installation 11 bears on two supports 15 which are fastened to the chassis 2 and are upwardly oriented. Each support 15 has a horizontal bearing portion 16. The bearing portions 16 are disposed so as to be in mutually opposite directions and point outward toward the two longitudinal sides 7 of the transportation apparatus 1. Shock-absorbing sections 17 on which the storage installation 11 bears may be located on the bearing portions 16. The illustration drawn with dash-dotted lines clarifies the mobility of the storage installation 11. In a known manner, this mobility is required in order to be able to nest like transportation apparatuses 1. The supports 15, by way of their lower ends, are fastened in each case to one longitudinal beam 3, for example. However, said supports 15 may also be provided on the transverse web 6. The spaced-apart vertical portions 18 of the supports 15 may be connected by a transverse piece 19. As can be seen from the drawing, a free space 20, which in the exemplary embodiment commences at a transverse stay 23a and following the vertical direction terminates at the bottom at the transverse piece 19, is formed between the sections 18. At least one free space 20 is thus formed beside each support 15. The supports 15 are disposed so as to be symmetrical to the vertical central axis 8 of the transportation apparatus 1, this also applying to the following exemplary embodiments. Lying on the central axis 8, at least one support element 22 in the form of a roller which is rotatable about a horizontal axis or in the shape of at least one slider which is disposed in a locationally fixed manner is provided at the front end of the storage installation 11. This at least one support element 22 in the known manner serves for being driven onto an impact face 24 of a transportation apparatus 1 which is located in front when two transportation apparatuses 1 have to be pushed into one another in a space-saving manner. The impact face 24 is located behind the rear end 12 of the storage installation 11. The impact face 24 points to the rear and is downwardly inclined. The impact face 24, of which there may also be two, in the example is fastened to the horizontal transverse stay 23a which, disposed so as to be spaced apart from the horizontal axis 13, connects either the two longitudinal beams 3 or the two spars 21. In the example, the two spars 21 carry a conical basket 25 which is intended for further goods, as is typical in the case of nestable shopping carts. Means 26, such as handles, which enable the transportation apparatus 1 to be manually moved, are provided on the basket 25. The transportation apparatus 1 may also be equipped without the basket 25. In this case, the spars 21 lead further up and at their ends carry the means 26 provided for moving the transportation apparatus 1. Given a corresponding design, the means 26 may also be formed by the spars 21 themselves. It can be derived from the selected view (front view) in the longitudinal direction of the transportation cart 1 according to FIG. 2 that the at least one impact face 24 is visualized to be located between the two supports 15, that is to say beside each support 15 and thus in the free space 20. Each impact face 24 is thus visualized to be plunged into a free space 20. The clear spacing of the two supports 15, and thus also the width of the free space 20, here is larger than the measured horizontal width of the at least one impact face 24. The free space 20 is likewise designed to be so deep that there is no collision between the impact face 24 of the transportation apparatus 1 which is located in front and parts of the transportation apparatus 1 to be pushed in which are adjacent to the free space 20 thereof, when two transportation apparatuses 1 are being pushed into one another (cf. also FIG. 4). The or each downwardly oriented free space 20 therefore in the vertical direction terminates lower down that the lower delimitation 24a of the at least one impact face 24 (cf. also FIG. 1 and FIG. 4, dimension a). When transportation apparatuses 1 are pushed into one another, the two supports 15 of a transportation apparatus 1 to be pushed in thus also do not contact the at least one impact face 24 of the transportation apparatus 1 which is located in front. The impact face 24 of the transportation apparatus 1 which is located in front utilizes the free space 20 of the transportation apparatus 1 to be pushed in when the transportation apparatuses are being pushed into one another. The same applies in an analogous manner to the following exemplary embodiment. On account of these inventive measures it is possible for like transportation apparatuses 1 to be nested in an extremely tight manner, even when the storage installation 11 in the use position is disposed so as to be exactly horizontal, as is illustrated. In the nested state the storage installations 11 of the transportation apparatuses 1 stored in one row are raised in a known manner.

Figure 3:
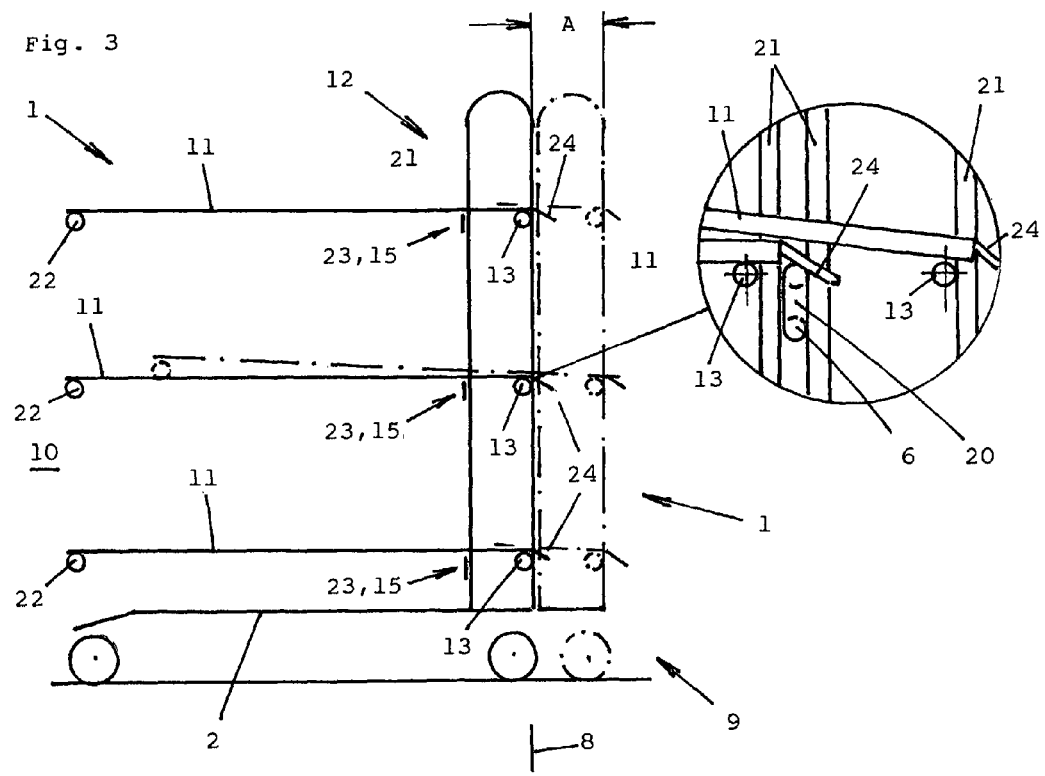
FIG. 3 shows a side view of a transportation apparatus having three platform-type storage installations, and in outlines a further like transportation apparatus.

FIG. 3 shows a side view of a mobile transportation apparatus 1 which is likewise manually movable and in contrast to FIGS. 1 and 2 is equipped with more than one storage installation 11. In the example there are three storage installations 11 which are disposed on top of one another. Proceeding from the chassis 2 which is equipped with castors 3 and 4, two spars 21 in pairs extend vertically upward in the rear region 9, emanating from the two longitudinal sides 7 of the transportation apparatus 1. Means such as known handle portions for pushing or moving the transportation apparatus 1 are provided on the spars 21. In the exemplary embodiment each storage installation 11 is mounted so as to be pivotable about in each case one horizontal axis 13 at the rearmost of the two spars 21. Each storage installation 11 is supported on two supports 15, located respectively on a transverse connection piece 23, wherein each transverse connection piece 23 connects the frontmost of the two spars 21 which are disposed in pairs. At the rear end 12 of each of the storage installations 11 in each case at least one impact face 24 which is downwardly inclined toward the rear is provided. Each storage installation 11 at its front end again has at least one support element 22, wherein each storage element 22, as has already been described in FIG. 1 and FIG. 2, is specified for driving onto an impact face 24 of a transportation apparatus 1 which is located in front when two transportation apparatuses 1 have to be pushed into one another in a space-saving manner.

A further like transportation apparatus 1 which has been pushed in a space-saving manner into the just described transportation apparatus, is illustrated with dotted-dashed lines. The minimum spacing of the two transportation apparatuses 1, which is established here, is identified by the letter A. On account of the formed free spaces 20, each transverse connection piece 23 by way of its supports 15 has undershot the rearwardly projecting impact faces 24 of the transportation apparatus 1 which is located in front (cf. FIGS. 4 and 5). On account thereof, it is possible to achieve extremely small nesting spacings having the dimension A. In contrast to the exemplary embodiment which has been described in FIGS. 1 and 2 and in which the supports 15 are located in the front region 10 and the horizontal axes 13 are located in the rear region 9, in the exemplary embodiment described here both the supports 15 as well as the horizontal axes 13 are disposed only in the rear region 9. In the example, the impact faces 24 of the transportation apparatus 1 which is located in front (on the left side of the drawing) claim the free spaces 20 of the transportation cart 1 which has been pushed in (cf. also the enlarged illustration).

Figure 4:
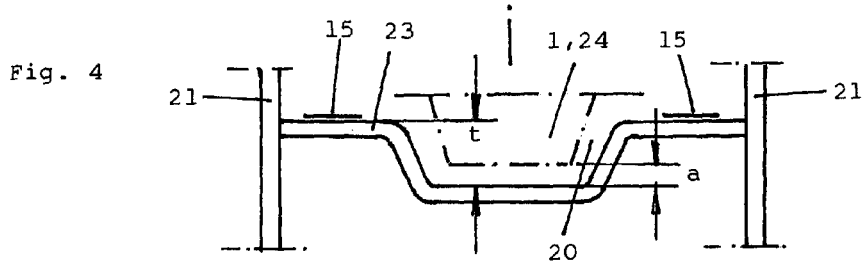
FIG. 4 shows a transverse piece having two supports and a downwardly extending free space.

FIG. 4 shows one of the three transverse connection pieces 23 (cf. FIG. 3) on which the supports 15 are located. By means of the drawing the frontmost of the two spars 21 which are connected by the transverse connection piece 23, can be seen. The two supports 15 are outlined. Each transverse connection piece 23 in the center is bent downward so that a downwardly extending free space 20 is formed on account of the resulting depth t and on account of the thickness of the transverse connection piece 23. The free space 20 in the vertical direction terminates lower down than the lower delimitation 24*a* of the impact face 24 (see dimension a and FIG. 5). The two supports 15 are separated by the downwardly extending free space 20. An impact face 24 of the transportation apparatus 1 is illustrated in a dotted-dashed manner. In relation to each transverse connection piece 23, at least one downwardly extending free space 20 is thus formed beside the two supports 15, wherein in the horizontal view of the transportation apparatus 1 along the longitudinal direction thereof the impact face 24 is visualized so as to be located between the supports 15 and plunging into the free space 20 while claiming at least part of the free space 20. The transportation apparatus may also be equipped with two impact faces 24 which then are also visualized to plunge into the free space 20.

Figure 5:
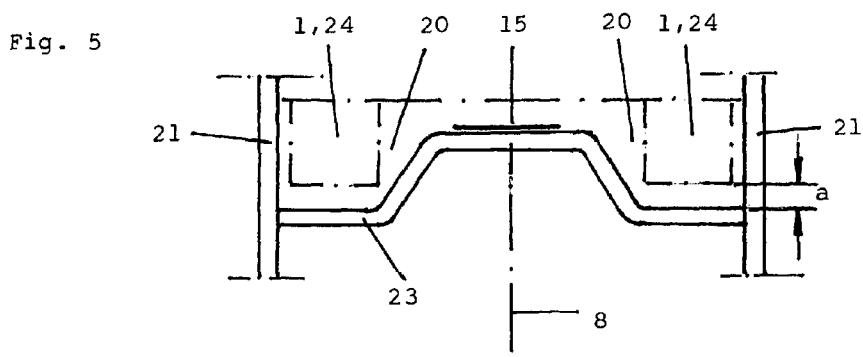
FIG. 5 shows a transverse piece having one support and two downwardly extending free spaces.

In a modification of the achieved solutions previously shown, FIG. 5 shows a transverse connection piece 23 having only one support 15 which is located between or beside two free spaces 20. Two impact faces 24 and two support elements 22 are thus provided, wherein when viewed in the horizontal direction of the transportation apparatus 1, each impact face 24 plunges into a free space 20.

The mobile transportation apparatuses 1 described above have preferably been described as carts which are manually movable. Notwithstanding, the invention also extends to all mobile transportation apparatuses 1 which have motive power, for example, and either lend a facilitating effect to the user of such transportation apparatuses 1, or are driven by the user, or are equipped with corresponding steering means so as to be also suitable for autonomous driving.

It should also be mentioned that the at least one storage installation 11 need not necessarily be designed so as to be of a platform type. The term storage installation 11 rather extends to all suitable and known installations on which items may be stored or may also be hooked onto rods or hooks. Two storage installations 11, for example configured as raisable rails, may also be disposed beside one another.

What is claimed is:

1. A first transportation apparatus which is nestable in a space-saving manner with a second transportation apparatus that is identical to the first transportation apparatus, the first transportation apparatus includes a chassis with longitudinal beams, wherein upward running spars located in a rear section of the first transportation apparatus emanate from each longitudinal beam, wherein a storage installation is mounted on the chassis so as to be movable relative to the chassis about a horizontal axis which is located in the rear section of the first transportation apparatus and bears on two upward running supports which are located on the chassis to form a free space between the two upward running supports, wherein at least one support element is provided at a front end of the storage installation, wherein the rear section of the first transportation apparatus includes at least one inclined impact face which is downwardly and rearwardly inclined and is specified for two support elements of the second transportation apparatus, wherein the first transportation apparatus is able to be pushed into the second transportation apparatus located in front of the first transportation apparatus, to be run thereonto, wherein the free space starts at a transverse connection piece, which connects the longitudinal beams or the two upward running spars, and the free space vertically ends lower than a lower delimitation of the at least one inclined impact face, such that in a horizontal view of the first transportation apparatus and when viewed along the longitudinal direction, each inclined impact face of the first transportation apparatus is positioned so as to be plunged into a free space of the second transportation apparatus, such that during nesting of the first and second transportation apparatuses each inclined impact face of the first transportation apparatus occupies the free space of the second transportation apparatus, and a front end of a storage installation of the second transportation apparatus is disposed between front and rear ends of the storage installation of the first transportation apparatus such that the storage installation of the second transportation apparatus is stacked upon the storage installation of the first transportation apparatus.

2. The first transportation apparatus as claimed in claim 1, wherein the upward running supports are disposed so as to be symmetrical with each other about to a vertical central axis of the first transportation apparatus.

3. The first transportation apparatus as claimed in claim 1, wherein the upward running supports are disposed either on the longitudinal beams or on a transverse web which connects the longitudinal beams.

4. The first transportation apparatus as claimed in claim 1, wherein each upward running support has a bearing portion, the bearing portions extend laterally outward in opposite directions.

5. The first transportation apparatus as claimed in claim 4, wherein each bearing portion is equipped with an elastic and shock-absorbing section and the storage installation bears on the shock-absorbing sections.

6. The first transportation apparatus as claimed in claim 1, wherein the at least one impact face is fastened to a transverse stay which connects either the longitudinal beams or the upward running spars.

7. The first transportation apparatus as claimed in claim 1, wherein the at least one impact face is disposed at a rear end of the at least one storage installation.

8. The first transportation apparatus as claimed in claim 1, wherein the storage installation is disposed so as to be horizontal.

9. The first transportation apparatus as claimed in claim 1, wherein the at least one inclined impact face is located at the transverse connection piece.

10. The first transportation apparatus as claimed in claim 1, further comprising at least one additional storage installation, which is mounted on the chassis so as to be movable about a horizontal axis and which bears on at least two additional upward running supports to form an additional free space between each additional two supports.

\* \* \* \* \*